US011966865B1

(12) United States Patent
Whitaker

(10) Patent No.: US 11,966,865 B1
(45) Date of Patent: Apr. 23, 2024

(54) INDIVIDUALIZED GYM FACILITY AND RELATED METHODS

(71) Applicant: Brian Whitaker, Aubrey, TX (US)

(72) Inventor: Brian Whitaker, Aubrey, TX (US)

( * ) Notice: Subject to any disclaimer, the term of this patent is extended or adjusted under 35 U.S.C. 154(b) by 0 days.

(21) Appl. No.: 18/497,310

(22) Filed: Oct. 30, 2023

(51) Int. Cl.
| | |
|---|---|
| *G06Q 10/00* | (2023.01) |
| *G01C 21/20* | (2006.01) |
| *G06Q 10/02* | (2012.01) |
| *G07C 9/00* | (2020.01) |
| *G07C 9/28* | (2020.01) |

(52) U.S. Cl.
CPC .......... *G06Q 10/02* (2013.01); *G01C 21/206* (2013.01); *G07C 9/00904* (2013.01); *G07C 9/28* (2020.01)

(58) Field of Classification Search
None
See application file for complete search history.

(56) References Cited

U.S. PATENT DOCUMENTS

| | | | | |
|---|---|---|---|---|
| 10,009,868 | B1* | 6/2018 | Reyes | G06Q 30/0261 |
| 2008/0275741 | A1* | 11/2008 | Loeffen | G06Q 10/02 |
| | | | | 705/26.1 |
| 2009/0298426 | A1* | 12/2009 | Helvick | G06Q 10/109 |
| | | | | 705/5 |
| 2010/0201482 | A1* | 8/2010 | Robertson | G07C 9/00904 |
| | | | | 340/5.61 |
| 2014/0114931 | A1* | 4/2014 | Cline | G06Q 30/0259 |
| | | | | 707/754 |
| 2014/0236732 | A1* | 8/2014 | Abhyanker | H04L 65/403 |
| | | | | 709/204 |
| 2015/0193739 | A1* | 7/2015 | Min | G06Q 10/06314 |
| | | | | 705/5 |
| 2015/0240507 | A1* | 8/2015 | Kolodny | E04H 3/14 |
| | | | | 52/234 |
| 2015/0279183 | A1* | 10/2015 | Kobayashi | H04W 4/90 |
| | | | | 455/404.1 |
| 2016/0042582 | A1* | 2/2016 | Hyde | G07C 9/00944 |
| | | | | 70/53 |
| 2016/0189453 | A1* | 6/2016 | Johnson | H04W 4/023 |
| | | | | 340/5.61 |
| 2020/0027036 | A1* | 1/2020 | Unnerstall | G06Q 20/40 |

OTHER PUBLICATIONS

Garage Gym Life Media Are You Ready to Timeshare Your Garage Gym? URL: https://garagegymlifemedia.com/2018/05/02/rent-garage-gym/ (Year: 2018).*
PeerSpace What's Like An Airbnb For Gyms? URL: https://www.peerspace.com/resources/whats-like-an-airbnb-for-gyms/ (Year: 2022).*

\* cited by examiner

*Primary Examiner* — Tonya Joseph
(74) *Attorney, Agent, or Firm* — Sam Pierce

(57) ABSTRACT

According to an aspect of the present invention, there is provided a method of scheduling usage of modular exercise facility, comprising: presenting at least two types of workout rooms on a graphical interface of a user computing device; receiving a selection from the user device for one of the types of workout rooms; receiving a selection from the user device of a date and time; referencing a MySQL database of prior reservations on the date and time; calculating a room assignment to a workout room recorded as available in the MySQL database; and displaying a map to the assigned workout room on the user device.

9 Claims, 4 Drawing Sheets

INDIVIDUALIZED GYM FACILITY AND RELATED METHODS

BACKGROUND

Facilities, methods, and systems for health clubs, gyms, workout facilities, and the like have been described in the prior art patent literature.

For example, U.S. Pat. No. 8,038,577, entitled Personal workout management system, discloses a method of controlling at least one environmental condition of at least one user during an exercise session comprising: a) providing a data terminal wherein the data terminal can identify the user; b) providing a server in data communication with the data terminal wherein the server stores or has access to personal data about the user; c) providing at least one environmental control device in data communication with the server wherein the environmental control device controls the environment condition of the user in accordance with the personal data of the user, and d) providing at least one sensor in data communication with the server, wherein the sensor is capable of monitoring and predicting a user's location, and wherein the environmental control devise controls the environmental condition of the user as the user changes locations.

U.S. Pat. No. 8,944,961 discloses system to obtain exercise equipment information, the system comprising: an accumulated data storage unit; and a first control server associated with a first fitness facility to: gather first usage information from a first fitness equipment unit; send the first usage information from the control server to the accumulated data storage unit; gather second usage information from a second fitness equipment unit; and send the second usage information from the control server to the accumulated data storage unit, wherein the accumulated data storage unit is configured to send the first usage information from the accumulated data storage unit to a requester.

Nevertheless, there remains a need for personal, private workout facilities, particularly in light of the infectious disease concern raised by the COVID-19 pandemic. Facilities, methods, and systems which provide and/or enable physical individualized workout space are desirable.

SUMMARY OF INVENTION

Therefore, the present invention provides a private and personal space for exercising to a person. The present invention provides a unique method that creates a new process of going to the gym utilizing a mobile application via a smart device such as a smart phone. In addition, the present invention allows a person to know that the personal space in which they are planning to use for exercising is thoroughly clean and sanitized.

According to an aspect of the present invention, there is provided a method of scheduling usage of modular exercise facility, comprising: presenting at least two types of workout rooms on a graphical interface of a user computing device; receiving a selection from the user device for one of the types of workout rooms; receiving a selection from the user device of a date and time; referencing a MySQL database of prior reservations on the date and time; calculating a room assignment to a workout room recorded as available in the MySQL database; and displaying a map to the assigned workout room on the user device.

According to another aspect of the present invention, there is provided a modular exercise facility with a plurality of individually assignable workout rooms, comprising: a total surface area of approximately 12,600 square feet; a first workout room type approximately 280 square feet in terms of surface area; a second workout room type approximately 300-360 square feet in terms of surface area; a third workout room type approximately 300-360 square feet in terms of surface area; and a fourth workout room type approximately 600 square feet in terms of surface area.

DETAILED DESCRIPTION

The present invention creates a new method of going to the gym by utilizing technology to revolutionize the fitness experience with privacy and solitude. In addition, the present invention also promotes a sanitary and hygienic area for physical activity for the user. The present invention creates a unique process of going to the gym through a mobile application and providing a private and personal workout room for the users.

The present invention comprises a software application and a facility. The software application is utilized by the user to allow the user to sign-up for a subscription, path to the facility, schedule a workout, order additional amenities, reschedule a workout, and purchase in-house products.

Figure 1:
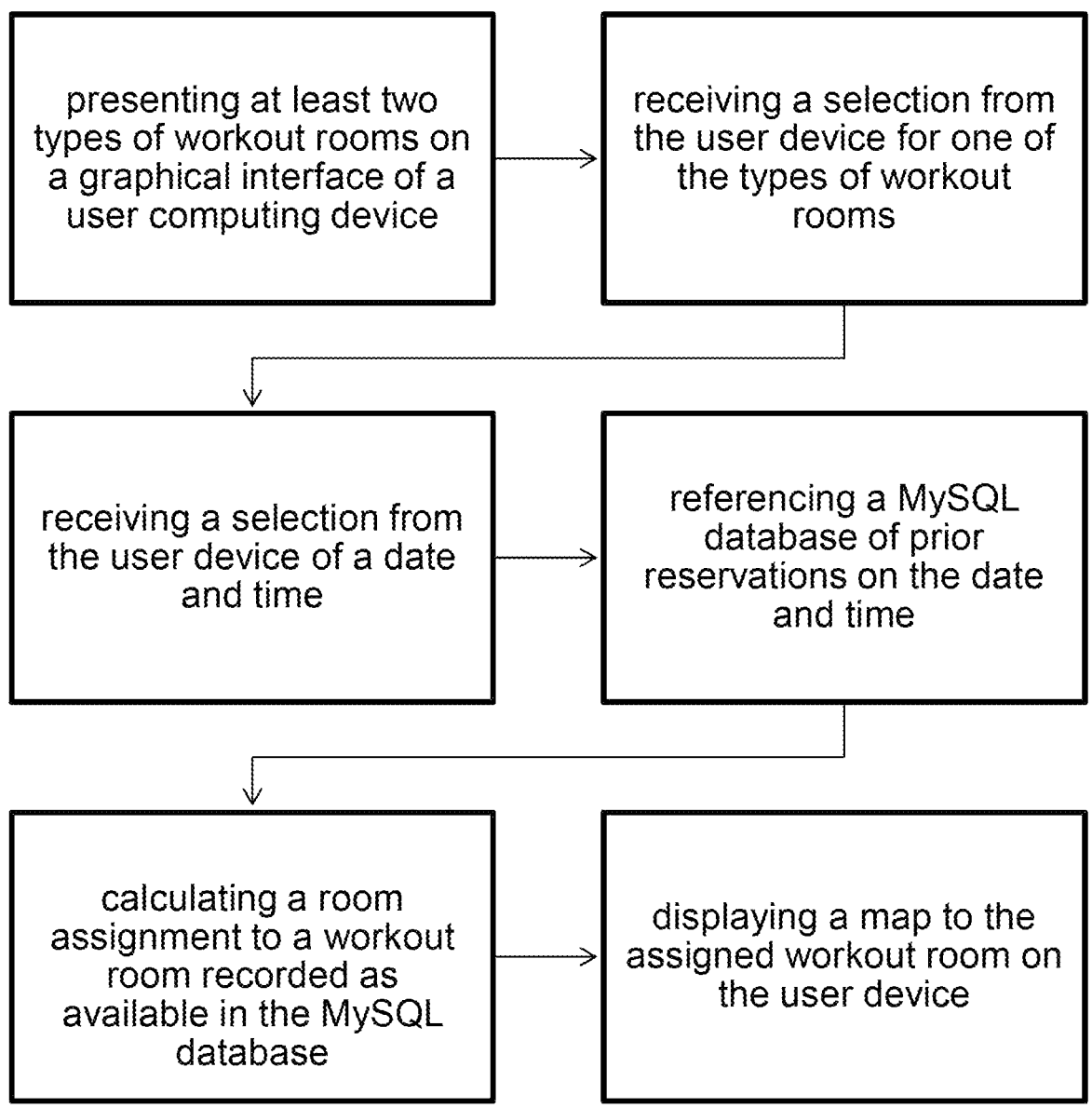
FIG. 1 is a flow chart of a process according to an embodiment.

FIG. 1 is a flow chart of a process according to an embodiment.

The process of using the The Fitness Company software application is shown. To begin, the users must download the software application onto their smart device such as a smart phone. After having to successfully download the software application, the user will need to log in to their own account with the necessary credentials required. If the user does not have an account, then the user must sign up for a new account with the respective requested credentials.

After the user has logged into their The Fitness Company account, the user can have an option of different subscription services to choose from. One benefit of the different subscription is the amount of work out sessions allowed per week. The user has a choice of subscription A, B, or C. Subscription A is least premium of the three, subscription B is the middle ground of the three, and subscription C is the most premium subscription possible of the three. Once a subscription is chosen, the user will be able to schedule a workout.

It is important to note that once the user has downloaded the The Fitness Company application onto their phone, the user will not need to download it again unless the software has been uninstalled.

Furthermore, the user will only need to make a single account that can be reused overtime as well as choose a subscription once. In addition, the user is able to manage subscription by choice within the fitness software application.

Scheduling a workout is the next process after successfully logging into their account. The user will be able to schedule a workout after successfully logging in and choosing a subscription.

The user is presented at least two types of workout rooms on a graphical interface of a user computing device;

displaying a map to the assigned workout room on the user device. Pods A, B1, B2 and C are equipped with different exercise machines to target specific parts of the body. Pod A is for a full body workout, pod B1 targets the lower body, pod B2 targets the upper body, and pod C is for a full body workout and also features an in-room steam shower and sauna.

The user will schedule the pod they would like to work out in, by making selection from the user device for one of the types of workout rooms. Also, a selection is received from the user device of a date and time. Users are able to schedule a workout session of one and a half hour, but can enjoy the other amenities however long the user desires. In addition to scheduling a workout session, the user will have an option to bring a guest to accompany them during the workout.

Then, the system of an embodiment references a MySQL database of prior reservations on the date and time to confirm availability and calculate a room assignment to a workout room recorded as available in the MySQL database.

Furthermore, the user will have the option to order any additional amenities to couple with their workout session. The amenities will be presented and available to the user upon arrival to the room. Amenities included by the present invention include but are not limited to purified water bottles, plush eucalyptus infused towels, personal storage, protein bars, etc. The amenities that are encompassed are similarly to luxury hotel suites.

After the user has successfully scheduled a workout session in addition to ordered amenities, The Fitness Company software application will assist the user in reaching to the facility. The software application has a built in GPS to assist the user to the facility and assigned room. The built-in GPS by the The Fitness Company software allows users to use one application to route to the facility for convenience. The user will not need to use the The Fitness Company software application then switch over to an external software application to route to the facility. But instead, the GPS is built-in the The Fitness Company software application for convenience purposes. The map not only shows the route to the facility, but also the route to the assigned room within the facility, on the user computing device.

Upon the user's arrival to the facility, the software application will grant the user entry access to the facility. Once the user is successfully led to their scheduled workout room, the user will be presented with their additional amenities if it were ordered beforehand. In addition, the user will be granted complete access to the room. The user will be able to control everything within the room such as the television, audio, lighting, etc. The control and ability to operate the room is possible by the software application on the user's smart phone.

The software application may communicate with the lighting, audio, and television in different ways, depending on the embodiment. In some embodiments, the handheld user device and the various luminaires, or light bulbs, television, and audio speakers may communicate with each other using wireless infrastructure network such as WiFi, or other wireless network. Such networks may have various ways of configuring the network and enrolling the various luminaires so that the handheld user device may be able to communicate directly with the luminaires. In other embodiments, the handheld user device may communicate with a network controller. The network controller may then communicate with other devices, such as a computer and other network controller, to process the messages received from the handheld controller and pass them to the light bulbs, television and speaker. The network controller may communicate with the light bulbs, television(s), and speaker(s) over the same wireless network used to communicate with the handheld user device, a different wireless network, wired connections, or any combination of wireless networks, and wired connections. A network controller may be any type of network device and may refer to routers, switches, computers, gateways, Z-wave controllers, Zigbee coordinators, access points, or other types of network equipment.

In some embodiments, the handheld user device may communicate with a remote server located away from the home over a telephony data network and the remote server may then communicate with a network controller in the workout room, or directly with the various luminaires, speaker, televisions, to pass the control messages to the various luminaires in the workout room.

The workout room is equipped to target a variety of muscle groups if not all within the body. The private and personal rooms are equipped to target the upper body, the lower body, or a full body workout along with the latest fitness machines available on the market. In addition, Wi-Fi is available and integrated into the room to allow the user to utilize their The Fitness Company application to work with different pieces of equipment proficiently.

Some of the private and personal workout rooms may have a steam shower, sauna and vanity for a more luxurious experience. It is to note that each room, despite the subscription, will have a digital clock representing the amount of time that is left in their scheduled workout session.

Once the user's workout session is complete, the user will exit the room with all of their belongings. Associates of the facility will receive a signal to clean and sanitize promptly after the user has left the room.

On the way out, the user will have the ability to book their next scheduled workout session in advance through the software application. In addition, before leaving the facility, the users will have the option to browse and purchase additional products within the facility.

Figure 2:
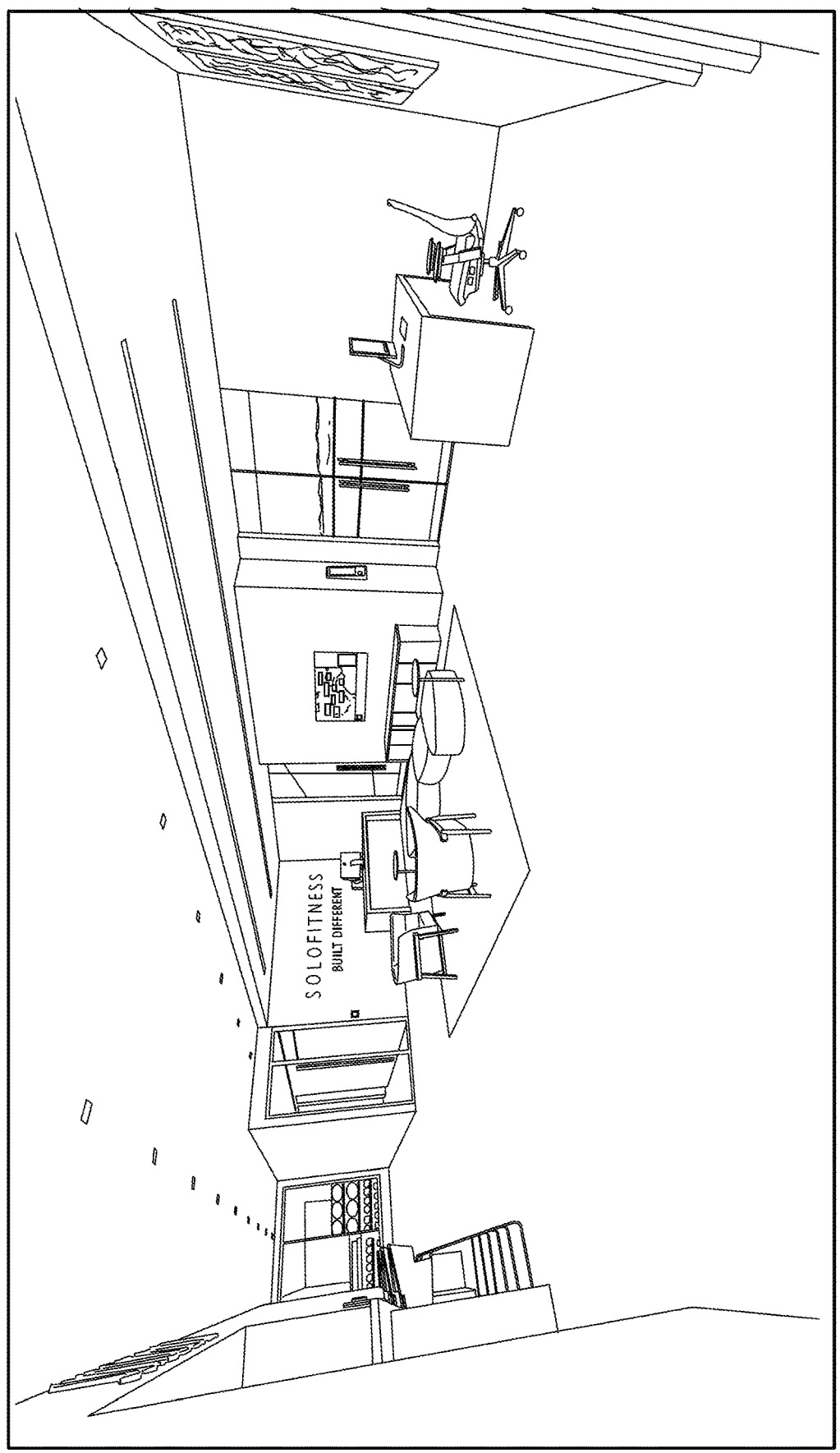
FIG. 2 illustrates an entrance to a modular workout facility of an embodiment.

FIG. 2 illustrates an entrance to a modular workout facility of an embodiment.

The entry/lounge area within the facility is shown. The user of the present invention is to arrive at the entry/lounge area of the facility when given access to the enter the building via the mobile application. The user has global positioning system (GPS) mapping route to arrive to the facility. Upon arrival, the user is given access to enter the building in which the first area is the entry/lounge area.

Figure 3:
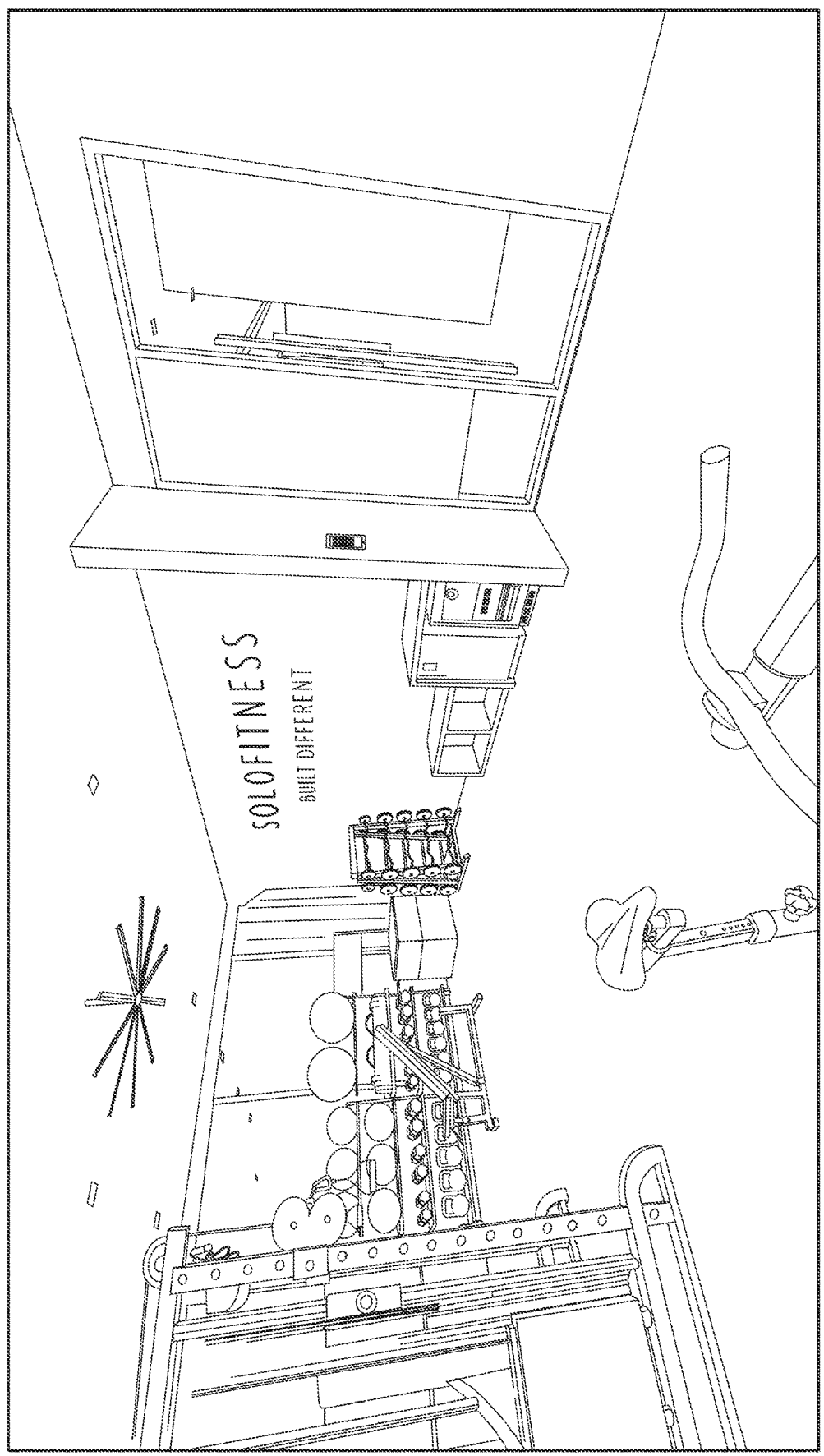
FIG. 3 illustrates an individually assignable workout room according to an embodiment.

FIG. 3 illustrates an individually assignable workout room according to an embodiment.

The personal and private workout room is given access to the user when successfully scheduled a workout session and arrived at the facility. When granted access, the user is able to control all equipment in the room. Equipment include but are not limited to the lights, audio, television, etc. The user is able to customize the setting in which they are working out in for a more personalized work out environment. When granted access to the workout room, no other person is able to control the room except the user until the workout session is over, except for an administrator of the facility.

Figure 4:
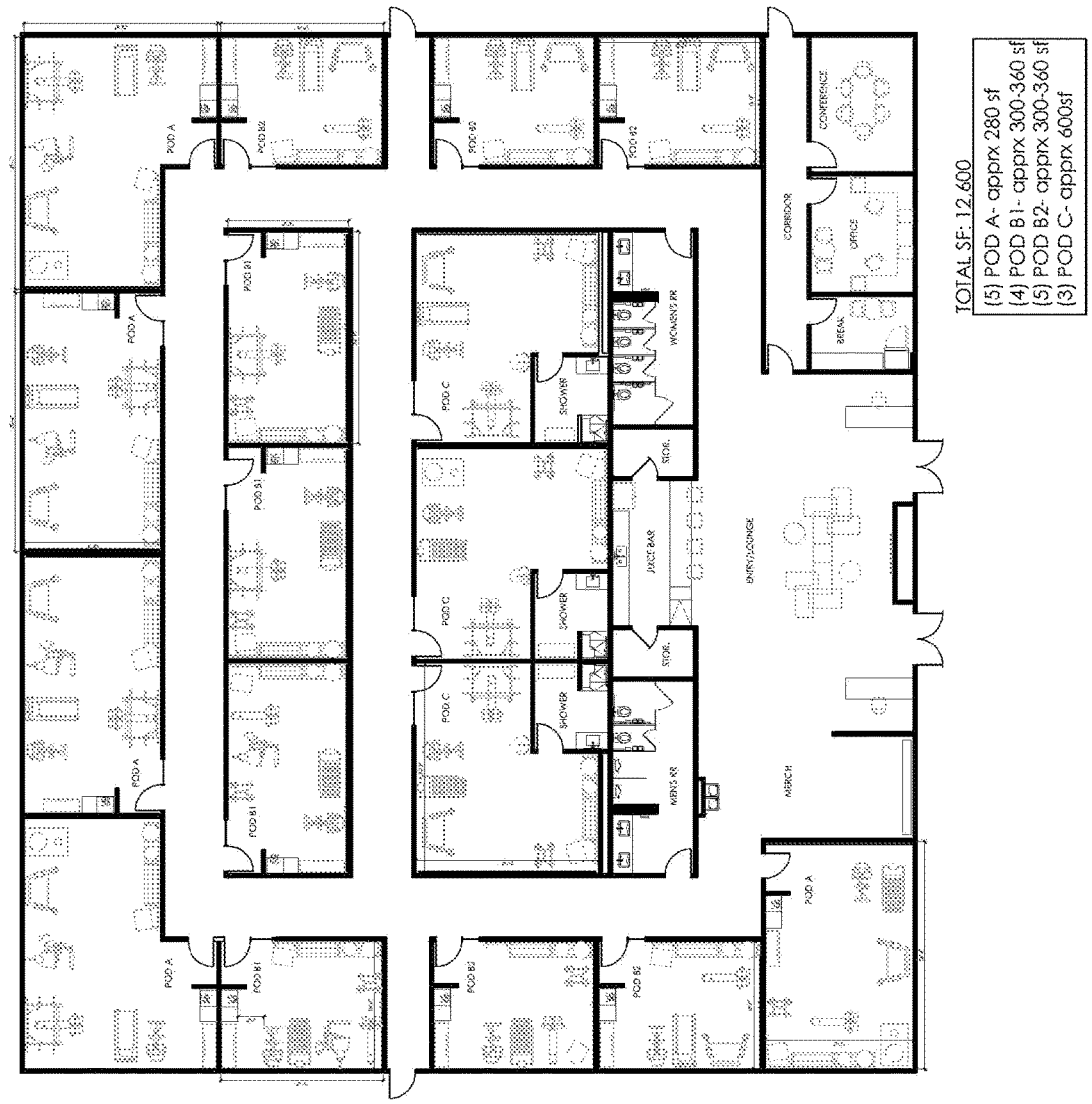
FIG. 4 illustrates a floor plan of a modular workout facility of an embodiment.

FIG. 4 illustrates a floor plan of a modular workout facility of an embodiment.

The facility is the location in which the gym is located. The facility has a total surface area of able 12,600 square feet. There are four different types of rooms: pod A, pod B1, pod B2, and pod C. Each type of room is a different size.

There exist five pod A rooms, four pod B1 rooms, five pod B2 rooms, and three pod C rooms. Pod A is approximately 280 square feet in terms of surface area. The total surface area of pod B1 is approximately 300-360 square feet. The total surface area of pod B2 is approximately 300-360 square feet. The total surface area of pod C is approximately 600 square feet.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Similar numerals designate similar elements among the several figures. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed.

What is claimed is:

1. A method of scheduling usage of modular exercise facility, comprising:
   presenting at least two types of workout rooms on a graphical interface of a user computing device;
   receiving a selection from the user device for one of the types of workout rooms;
   receiving a selection from the user device of a date and time;
   referencing a MySQL database of prior reservations on the date and time;
   calculating a room assignment to a workout room recorded as available in the MySQL database;
   assigning said workout room;
   displaying a map to the assigned workout room on the user device;
   presenting, on the user device, a list of selections for one or more of television, audio, and lighting settings for said workout room;
   receiving a selection of one or more of television, audio, and lighting settings at the user device;
   transmitting the selection over a Wi-Fi network to one or more network controllers, wherein at least one of the one or more network controllers is selected from the group comprising Z-Wave controllers and Zigbee coordinators;
   routing, at the one or more network controllers, the selection to another computing device(s);
   processing, at the another computing device(s), the selection received from the user computing device and generating a signal for the lighting, television, and/or audio;
   passing the signal from the another computing device(s) through the one or more network controllers selected from the group comprising Z-Wave controllers and Zigbee coordinators to the light bulbs, television screen, and/or speaker associated with the lighting, television, and audio respectively; and
   responsive to passing the signal, controlling one or more of the light bulbs, television screen, and/or speaker associated with the lighting, television, and audio respectively.

2. The method of scheduling usage of modular exercise facility of claim 1, further comprising presenting a list of amenities on the user computing device.

3. The method of scheduling usage of modular exercise facility of claim 2, further comprising receiving a selection of one or more amenities from the user computing device.

4. The method of scheduling usage of modular exercise facility of claim 1, further comprising unlocking the door to the assigned workout room based on a signal that the user computing device is in proximity to the door.

5. The method of scheduling usage of modular exercise facility of claim 1, further comprising locking the door to the assigned workout room based on a signal that the user computing device is no longer inside the workout room.

6. The method of scheduling usage of modular exercise facility of claim 1, further comprising sending an alert for cleaning and sanitizing the workout room based on a signal that the user computing device is no longer inside the workout room.

7. The method of scheduling usage of modular exercise facility of claim 1, wherein the workout room is located at the residence of an individual or family.

8. The method of scheduling usage of modular exercise facility of claim 1, wherein two to five types of workout rooms are presented.

9. The method of scheduling usage of modular exercise facility of claim 1, wherein the type of workout rooms presented are rooms in a modular exercise facility with a plurality of individually assignable workout rooms, comprising:
   a total surface area of approximately 12,600 square feet;
   a first workout room type approximately 280 square feet in terms of surface area;
   a second workout room type approximately 300-360 square feet in terms of surface area;
   a third workout room type approximately 300-360 square feet in terms of surface area; and
   a fourth workout room type approximately 600 square feet in terms of surface area.

* * * * *